Dec. 29, 1925.
H. H. TIMKEN
ROLLER BEARING
Filed May 31, 1924
1,567,822
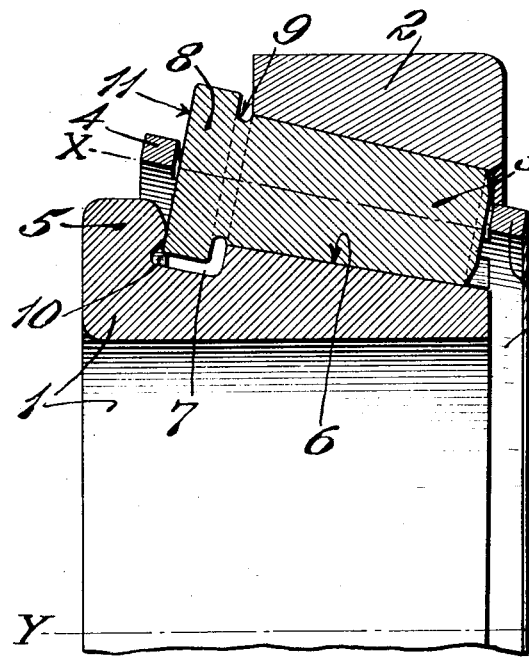
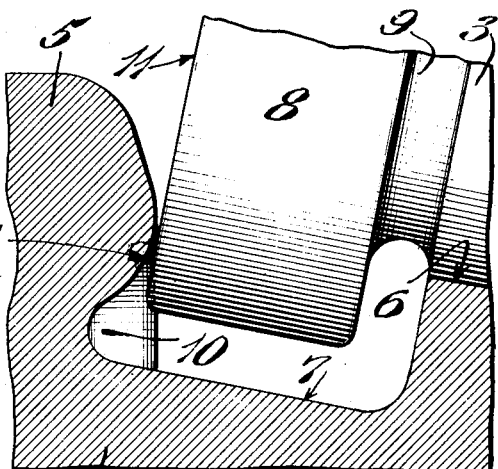
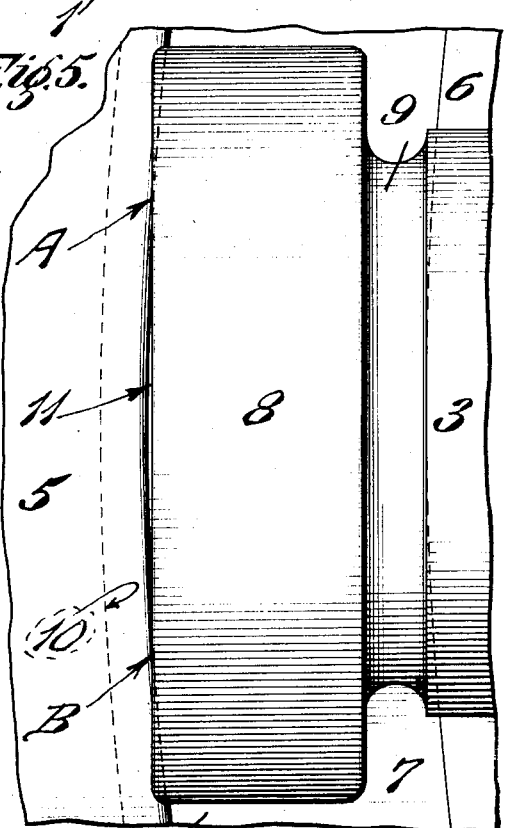
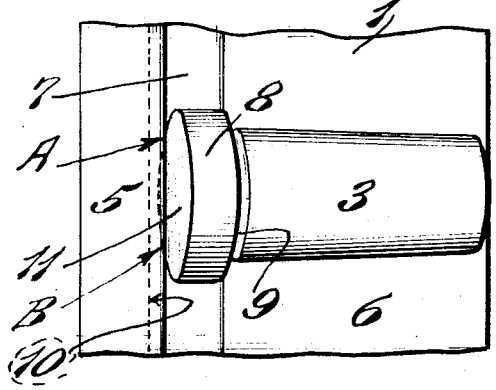
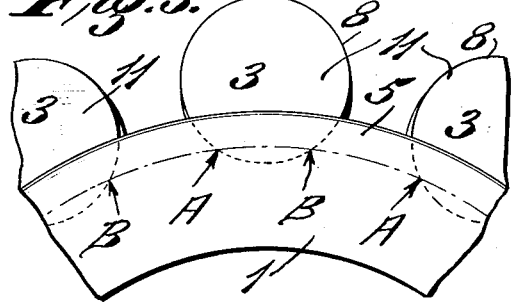

Patented Dec. 29, 1925.

1,567,822

UNITED STATES PATENT OFFICE.

HENRY H. TIMKEN, OF CANTON, OHIO, ASSIGNOR TO THE TIMKEN ROLLER BEARING COMPANY, OF CANTON, OHIO, A CORPORATION OF OHIO.

ROLLER BEARING.

Application filed May 31, 1924. Serial No. 717,004.

*To all whom it may concern:*

Be it known that I, HENRY H. TIMKEN, a citizen of the United States, and a resident of the city of Canton, in the county of Stark and State of Ohio, have invented a new and useful Improvement in Roller Bearings, of which the following is a specification.

My invention relates to roller bearings and has for its principal object to minimize the tendency of the rollers to cock or cant and to create a tendency for them to right themselves in case they become cocked. The invention consists principally in so correlating the rollers and the bearing cone that each roller will bear endwise against a shoulder on the cone at two points located in projected elements of the bearing surface of the cone and equidistant from the axis of the roller and on opposite sides thereof. It also consists in forming the cone with an undercut shoulder at one end separated from the conical bearing surface by a groove, and forming the roller with an enlarged head that enters said groove and has contact with said shoulder at two widely separated points in extended elements of the bearing surface of the cone. It also consists in the parts and in the constructions and arrangements of parts hereinafter described and claimed.

In the accompanying drawing which forms part of this specification and wherein like reference numerals refer to like parts wherever they occur, Fig. 1 is a longitudinal section of a portion of a roller bearing conforming to my invention, the axis of the roller being indicated by the dot and dash line *x—x* and the axis of the bearing by the dot and dash line *y—y*;

Fig. 2 is a longitudinal view of a portion of said bearing, the bearing cage being omitted;

Fig. 3 is an end view of a portion of said bearing, illustrating the position and spacing of the points of contact of the heads of the rollers with the rib of the cone, the circle on which said points of contact are located being shown by a dot and dash line;

Fig. 4 is a sectional view similar to Fig. 1, but on an enlarged scale, and

Fig. 5 is a view of the parts shown in Fig. 4, looking in the direction of the arrows 5—5 in Fig. 1, illustrating the relation of the rollers to the cone, said view being on the same scale as Fig. 4.

The present bearing comprises an inner bearing member or cone 1, an outer bearing member or conical cup 2, a circular series of antifriction rollers 3 interposed between the two bearing members, and a cage 4 for spacing the rollers. The cup and the cage may be of any usual or suitable construction.

The larger end of the cone is provided with an undercut annular rib or shoulder 5, and between said rib and the bearing surface 6, the cone is provided with an annular groove 7 adapted to receive the heads 8 of the rollers hereinafter mentioned.

Each of the rollers is enlarged at its larger end to form a head 8 that is designed to extend into the groove 7 of the cone and bear against the shoulder 5 of said cone. Preferably, a groove 9 is formed in the roller at the base of the enlarged head 8 thereof; and preferably all of the edges of the roller and of the cone are rounded off to prevent spalling.

As stated above, the rib 5 on the cone is undercut and the edge of the head 8 of each roller 3 extends into the recess 10 thus provided; and the end of the head 8 and the face of the rib 5 are so correlated that they contact with each other at two widely spaced points A and B equidistant from the axis of the roller and in extended elements of the bearing surface 6 of the cone.

The relation of the parts is indicated in the drawing. Assuming that the end face 11 of the head 8 of a conical roller 3 is a plane surface at right angles to the axis of said roller, it is obvious that the plane of this surface is inclined to the axis of the bearing; and the nearer any point in said plane is to the axis of the bearing, the closer it is to the plane of the large end of the bearing cone. If the face of the rib or shoulder 5 were not undercut, the edge of the plane head 11 of the roller 3 would contact with said rib at the base thereof and such contact would be limited to a single point. By undercutting said shoulder 5, a recess 10 is formed into which the roller can be moved endwise toward the larger end of the cone until the plane surface 11 of the head 8 of the roller bears against such undercut rib; and, in such case, the contact is effected at two points A and B on opposite sides of the axis of the roller and equidistant therefrom. This is due to the fact that the plane 11 of the head of the roller is inclined with relation to the plane of the face of the annular rib 5 and intersects the same in a line that constitutes a chord of the rib circle and also a chord of the roller circle. The ends of this chord are the points of contact A and B of the end of the roller with said rib; and, as will appear hereinafter, the greater the length of this chord is, the greater is the leverage action that tends to make the roller self-righting.

As the rib 5 is of annular form and its points of contact with the head of the roller are at the ends of a chord of the rib circle, such points are equidistant from the axis of the cone; but their distance from such axis may, within limits, be varied by the designer. In the present case, it is desirable for such points to fall in projected elements of the bearing surface of the cone; and for this purpose the designer may assume the plane of the head of the roller as a base and give the rib such sectional shape (in the plane of the axis of the bearing) that the point in such section nearest to said plane will be in the extended element of said cone in said plane. This particular point is space slightly from the head of the roller at the time; but it is in the rib circle and therefore equidistant from the axis of the cone with the two chordal points against which said head actually bears.

As hereinbefore stated, on account of the end surface 11 of the head 8 being a plane surface and set at an angle to the axis of the annular rib, the points A and B of contact between the head and the rib are at the ends of a chord A—B, common to the rib circle and the roller circle. The rise of the arc of the rib circle subtended by this chord A—B plus the rise of the arc of the roller circle subtended by this same chord is equal to the depth of the head, the term depth being intended to mean the radial distance from the projected cone of the bearing surface of the body of the roller to the points A and B in the head thereof that contact with the rib or shoulder of the cone of the bearing. This depth of the head determines the length of the chord; and the length of the chord, in turn, determines the leverage action upon which depends the capacity of the roller to right itself.

The operation of the device is as follows: Assuming that the rollers 3 are properly positioned and spaced on the bearing cone 1, their axes intersect the axis of the cone. In this position, radial pressure on the rollers is resolved partly into thrust endwise of the rollers, by virtue of which the heads 8 of the rollers are pressed endwise against the rib 5 on the cone, so that the inner edge of each roller enters the recess 10 of the cone while the head 8 of the roller bears against the rib of the cone at two points A and B equidistant from the axis of the roller and on opposite sides thereof. In case the roller becomes cocked, it swings bodily upon one or the other of its two points of contact with the rib of the cone; and this swinging action breaks the contact at the other point between the roller and the rib. In this position, the normal endwise thrust tends to push the roller longitudinally toward the larger end of the cone, and as the roller is already in contact with the rib of the cone at one point, the roller rocks or swings on this point until its head brings up against the rib of the cone at a second point equidistant with said first mentioned point from the axis of the roller.

It is noted that on account of the points of contact being located in elements of the cone, friction is minimized; and therefore the contact necessary to take care of the thrust against the shoulder of the cone does not introduce into the bearing the very undesirable tendency to cock the rollers.

While the foregoing description assumes that the end of the head of the cone is a plane surface, it is noted that the head of the roller may be recessed axially, or it may be provided with an annular bearing rib, or it may be formed with a convex curvature provided the radius of curvature is long enough to insure a proper spacing of the two points of contact with the rib of the cone at or near the projected conical bearing surface of the cone. It is also noted that the invention is applicable to cylindrical roller bearings and the commonly recognized modifications thereof. For instance, where the inner and outer bearing members and the rollers themselves are of cylindrical form, the end of the roller may have an annular rib projecting endwise from its face, in which case the contact of the roller with the rib of the cone will be limited to the rib portion of such roller. In such case, of course, the head of the roller does not extend into the recess under the rib of the cone; but the undercutting of the cone rib localizes the contact at the two chordal points mentioned. I do not, therefore, wish to be restricted to the exact construction shown in the accompanying drawing.

What I claim is:

1. A roller bearing comprising inner and outer bearing members and headed rollers between them the inner member having an annular rib and the heads of the rollers contacting with said rib at two widely separated points, each of which is in a continuation of the bearing surface of said inner member.

2. A roller bearing comprising inner and outer bearing members and headed rollers between them one of said members having an annular rib and the heads of the rollers contacting with said rib at two widely separated points, each of which is in a continuation of the bearing surface of said member.

3. A roller bearing comprising conical inner and outer bearing members and rollers between them, said inner member having at its larger end an undercut annular rib located approximately in the projected bearing surface of said inner bearing member and a groove between said rib and the bearing surface of said inner member and each roller having an enlarged head whose edge portion bears against said rib at points on opposite sides of the axis of said roller and in continuations of the conical bearing surface of said inner bearing member.

4. A roller bearing comprising inner and outer bearing members and conical rollers therebetween, said rollers having enlarged heads, one of said bearing members having a recess to accommodate the heads of said rollers and having an undercut rib overlapping the ends of said rollers, said rib being shaped to contact with the end of each roller at two points located approximately in continuations of the raceway of said bearing member and on opposite sides of the axis of the roll.

5. A roller bearing comprising inner and outer bearing members and conical rollers therebetween, said rollers having enlarged heads whose ends are substantially plane, one of said bearing members having a recess to accommodate the heads of said rollers and having an undercut rib overlapping the ends of said rollers, said rib being shaped to contact with the end of each roller at two points located approximately in continuations of the raceway of said bearing member and on opposite sides of the axis of the roll.

Signed at Canton, Ohio, this 9th day of May, 1924.

HENRY H. TIMKEN.